(12) United States Patent
Tatsumi et al.

(10) Patent No.: US 6,398,095 B1
(45) Date of Patent: Jun. 4, 2002

(54) MAGNETIC TAPE RECORDING/REPRODUCING APPARATUS

(75) Inventors: Naoki Tatsumi; Masahiro Harima, both of Atsugi (JP); Renee Jessome, Boise, ID (US)

(73) Assignees: Mitsumi Electric Co., Ltd., Tokyo (JP); Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/459,188

(22) Filed: Dec. 10, 1999

(30) Foreign Application Priority Data

Dec. 21, 1998 (JP) .............................. 10-362954

(51) Int. Cl.⁷ .......................... B65H 20/36; B65H 57/28
(52) U.S. Cl. .......................... 226/180; 226/194; 226/21; 242/615.1
(58) Field of Search ................................ 226/180, 194, 226/21; 242/615.1

(56) References Cited

U.S. PATENT DOCUMENTS

| | | |
|---|---|---|
| 4,085,906 A | 4/1978 | Dahl |
| 4,231,504 A * | 11/1980 | Ketzer .................... 226/180 |
| 4,562,946 A | 1/1986 | Ryan |
| 6,073,826 A * | 6/2000 | Nagasaki et al. ............ 226/180 |
| 6,104,569 A * | 8/2000 | Chae et al. .................... 360/85 |

FOREIGN PATENT DOCUMENTS

| | | |
|---|---|---|
| DE | 1140737 | 12/1962 |
| EP | 0944054 | 9/1999 |
| GB | 2022904 | 12/1979 |
| GB | 2103428 | 2/1983 |

* cited by examiner

Primary Examiner—Michael R. Mansen
Assistant Examiner—Minh-Chau Pham
(74) Attorney, Agent, or Firm—Ladas & Parry (57) ABSTRACT

A magnetic tape recording/reproducing apparatus has a capstan tilt adjustment mechanism for adjusting the tilt of the capstan so that a magnetic tape runs substantially smoothly and without damage to the edges of the tape. The capstan tilt adjustment mechanism has a support plate for pivotally supporting the capstan, first and second supporting parts positioned on both sides of the capstan and which pivotally support the support plate with respect to a chassis, and an adjusting screw mechanism for pivoting the support plate with respect to the chassis. The first and second supporting parts are composed of a wedge-like supporting base portion formed on the chassis and a countersunk screw that passes through a hole in the support plate and screws into the supporting base portion. The supporting base portion has a rigidity that prevents movement of the support plate in a direction perpendicular to this surface. By manipulating the adjusting screw mechanism the support plate is tilted while being supported by the wedge-shaped supporting base portion.

6 Claims, 9 Drawing Sheets

MAGNETIC TAPE RECORDING/ REPRODUCING APPARATUS

BACKGROUND OF THE INVENTION

1. Field of the Invention

The present invention relates generally to a magnetic tape recording/reproducing apparatus, and more particularly, to a digital audio tape recorder (hereinafter "DAT") streamer to be used as a large-capacity external memory back-up device for computers.

2. Description of the Related Art

The DAT streamer uses a DAT tape cassette, with recording to and reproduction from the magnetic tape carried out by a high-speed rotating drum, that is, a rotating head, the magnetic tape being driven between a capstan and a pinch roller. In the case of the DAT streamer, the recording of data to the magnetic tape involves reproducing the recorded location to verify the recording. Accordingly, the capstan repeatedly rotates in a counter-clockwise and a clockwise direction, with the magnetic tape also repeatedly running in both a forward and a reverse direction.

In the case of the DAT streamer, in order for the recording of data to and the reproduction of data from the magnetic tape to be performed reliably the reverse run of the magnetic tape must be as smooth as the forward run of the magnetic tape. That is, the height at which the magnetic tape runs in the reverse direction in the vicinity of the capstan must be the same as the height at which the magnetic tape runs in the forward direction.

Figure 1A:
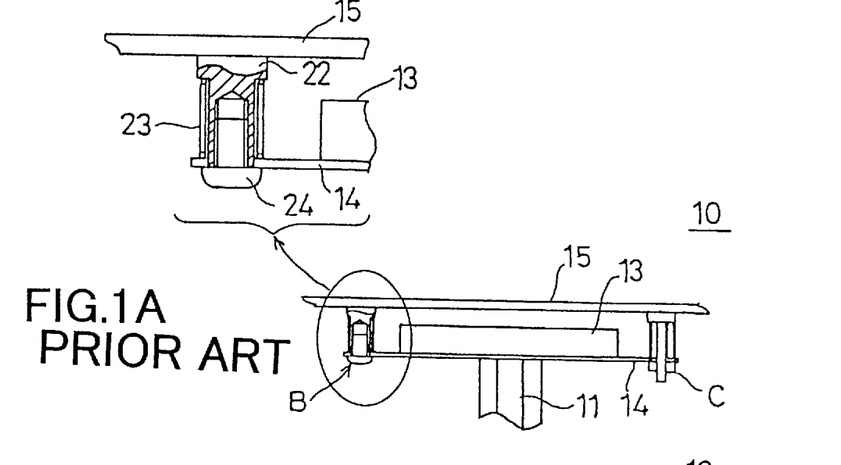
FIGS. 1A, 1B and 1C are diagrams of a conventional capstan tilt adjustment mechanism.
Figure 1B:
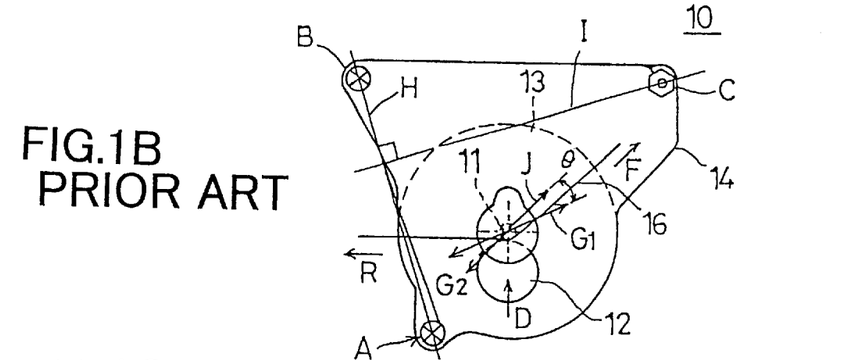
Figure 1C:
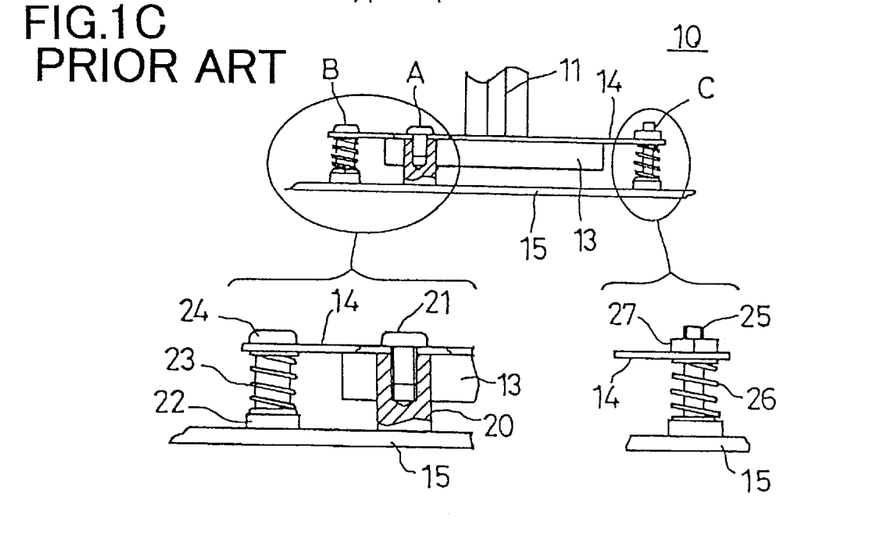

FIGS. 1A, 1B and 1C show a conventional capstan tilt adjustment mechanism 10 in a magnetic tape recording/reproducing apparatus. Reference numeral 11 is the capstan, 12 is the pinch roller, 13 is a capstan motor, 14 is a capstan motor support plate and 15 is a chassis. The capstan 11 itself forms the spindle of the capstan motor 13. The capstan motor 13 is mounted on a bottom surface of the capstan motor support plate 14, with the capstan 11 protruding upward through the capstan motor support plate 14. The capstan motor support plate 14 is fixedly mounted on the chassis 15 at three separate locations indicated in the drawings as A, B and C. The pinch roller 12 is pressed against the capstan 11 in the direction of the arrow D, sandwiching the magnetic tape 16 therebetween. When the capstan 11 rotates in the counter-clockwise direction, the magnetic tape 16 runs forward in the direction of arrow F. When the capstan 11 rotates clockwise, the magnetic tape 16 runs backward in the direction of arrow R. The direction in which the tilt of the capstan 11 should be adjusted is indicated by the arrows G1 and G2.

Mounting position A comprises the capstan motor support plate 14 set on a top edge of a post 20 formed on the chassis 15, with a screw 21 screwed into the post 20 so as to fixedly mount the capstan motor support plate 14 in place. Mounting position B comprises a coil spring 23 fitted around a periphery of a post 22 formed on a top of the chassis 15, a hole of the capstan motor support plate 14 fitted to the post 22, and a screw 24 screwed into the post 22 from a top edge of the post 22. The capstan motor support plate 14 is lifted upward by the coil spring 23 against a bottom surface of a head portion of the screw 24. Mounting position C comprises a coil spring 26 fitted around a bolt 25 formed on the chassis 15, a hole of the capstan motor support plate 14 fitted to the bolt 25, and a nut 27 fastened to the bolt 25. The capstan motor support plate 14 is lifted upward by the coil spring 26 and pressed against a bottom surface of a head portion of the nut 27.

Line H is a line connecting mounting position A and mounting position B. Line I is a line passing through mounting location C and intersecting with line H.

Tightening the nut 27 causes mounting location C of the capstan motor support plate 14 to sink, the capstan motor support plate 14 to tilt about the line H and an edge of the capstan 11 to tilt toward mounting position C parallel to line I. Conversely, loosening the nut 27 causes mounting location C of the capstan motor support plate 14 to rise and the capstan 11 to tilt away from mounting position C parallel to line I. In this manner the tilt of the capstan 11 is adjusted and the reverse run of the magnetic tape made the same as the forward run of the magnetic tape.

However, the direction of the tilt of the capstan 11 may in some cases be changed by the force of the coil spring 23 because mounting location B supports the capstan motor support plate 14 by using a coil spring 23. If the force of the coil spring 23 is weak, then the capstan 11 will tilt in the direction shown in arrow J when the nut 27 is manipulated, and consequently the tilt of capstan 11 will deviate from the proper adjustment direction by an angle θ. As a result, it can become difficult to make the reverse run of the tape the same as the forward run of the tape.

It is possible to prevent the above-described problem from arising by increasing the strength of the force of the coil spring 23. However, doing so increases the strength of the mounting at mounting position B of the capstan motor support plate 14. As a result, when the nut 27 is turned the section of the capstan motor support plate 14 bends at mounting position B, changing the gap between the magnet and the coil of the capstan motor 13 and thus changing the torque of the capstan motor 13. A change in the torque of the capstan motor causes instability in the run of the magnetic tape.

Additionally, the capstan motor support plate 14 is susceptible to external vibrations because mounting location B supports the capstan motor support plate 14 by using a coil spring 23.

SUMMARY OF THE INVENTION

Accordingly, it is a general object of the present invention to provide an improved and useful magnetic tape recording/reproducing apparatus in which the problems described above are eliminated. Another and more specific object of the present invention is to provide a magnetic tape recording/reproducing apparatus in which the tilt of the capstan is adjusted smoothly.

The above-described objects of the present invention are achieved by a magnetic tape recording/reproducing apparatus comprising:

a pinch roller;

a capstan against which the pinch roller presses so as to drive a magnetic tape; and a capstan tilt adjustment mechanism for adjusting the tilt of the capstan so that the magnetic tape runs substantially smoothly and without damage to the edges of the tape, the capstan tilt adjustment mechanism comprising:
    a support plate for rotatably supporting the capstan;
    a first supporting part and a second supporting part for pivotally supporting the support plate with respect to a chassis at positions on both sides of the capstan so as to tilt the capstan in a direction which ensures that the magnetic tape runs substantially smoothly and without damage to the edges of the tape; and an adjusting screw mechanism for pivoting the support plate with respect to the chassis, both the first and second supporting parts having a structure that pivotally fixes the support plate at a predetermined height position above the chassis.

According to the invention described above, the first and second supporting parts have a structure that restricts movement of the support plate in the vertical direction, so the tilt of the capstan can be adjusted smoothly in the proper adjustment direction because the support plate does not tilt along the direction of the first and second supporting parts. Accordingly, it is possible to make the magnetic tape behave the same way when run in reverse as when the magnetic tape is run forward.

Moreover, the first and second supporting parts have a structure that restricts movement of the support plate in the vertical direction, so vibration of the capstan motor support plate is not amplified in the event that external vibrations are received and the capstan and an area thereabout acquire a vibration resistance superior to that of the conventional art.

Additionally, the above-described objects of the present invention are achieved by the magnetic tape recording/reproducing apparatus as described above, wherein the first and second supporting parts each comprise:

a substantially wedge-shaped supporting base portion formed on the chassis; and a countersunk screw which passes through a hole in the support plate and screws into a hole in the supporting base portion and which mounts the support plate on the supporting base portion.

According to the invention described above, restrictive force exerted by the capstan motor support plate on the first and second supporting parts during its adjustment is small, so the pivotal displacement clockwise and counter-clockwise of the capstan motor support plate through the range of the small angle centered on line K does not unnecessarily bend the capstan motor support plate and, accordingly, the width of the air gap does not change. As a result, the characteristics of the capstan motor are not affected.

Other objects, features and advantages of the present invention will become more apparent from the following detailed description when read in conjunction with the accompanying drawings.

DESCRIPTION OF THE PREFERRED EMBODIMENT

A description will now be given of an embodiment of the present invention with reference to the accompanying drawings.

Figure 2:
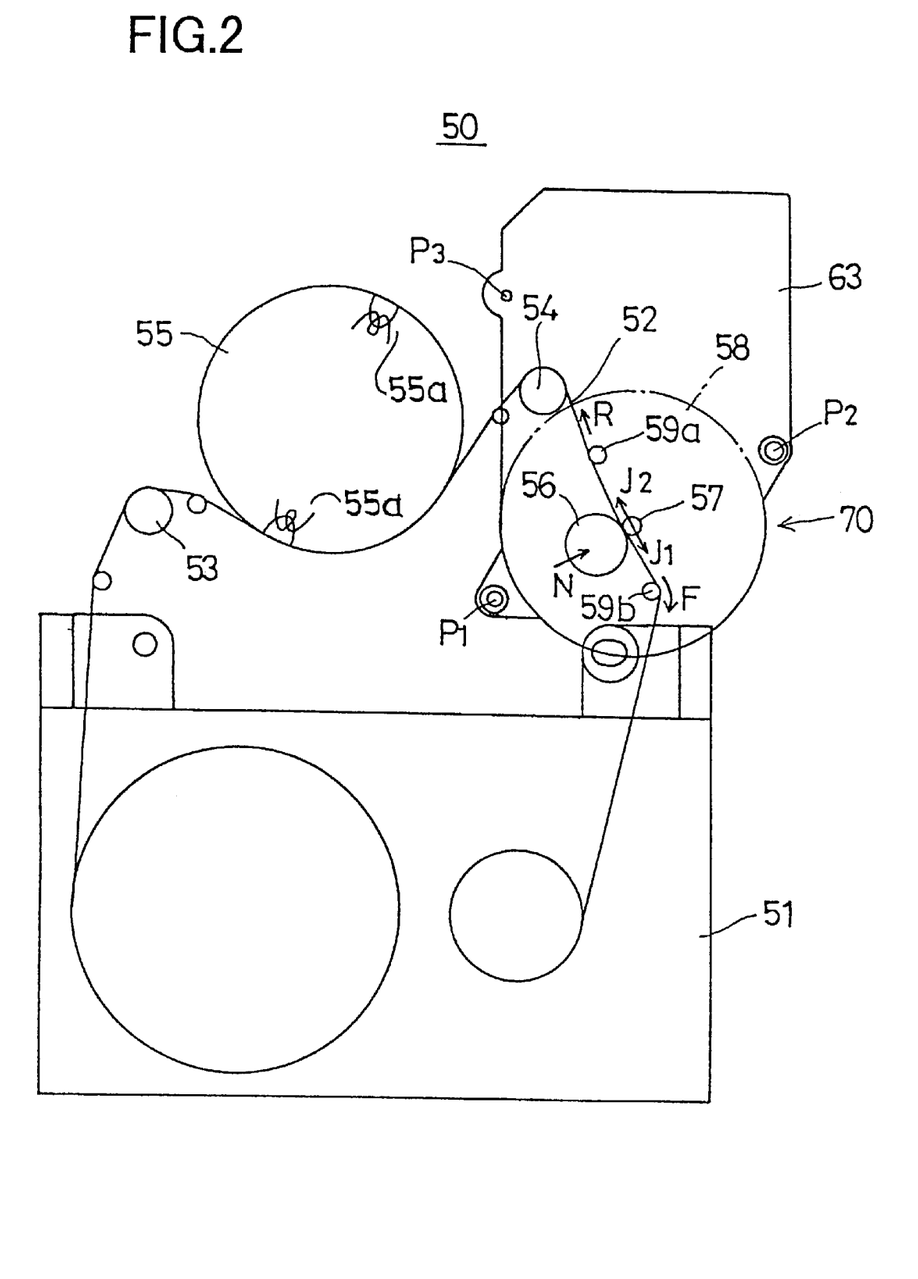
FIG. 2 is a schematic view of a DAT streamer according to an embodiment of the present invention.

FIG. 2 is a diagram showing a plan view of an embodiment of a DAT streamer 50 as the magnetic tape recording/reproducing apparatus according to the present invention. Magnetic tape 52 is extracted from a loaded DAT tape cassette 51 by loading poles 53 and 54, wound around a rotary drum 55 having rotary heads 55a and a pinch roller 56 is pressed against a capstan 57 from a direction indicated in the drawing by arrow N. When the capstan 57 is rotated by a capstan motor 58 in a counter-clockwise direction, the magnetic tape 52 is guided by poles 59a and 59b located on both sides of the capstan 57, the magnetic tape 52 is run in a forward direction indicated by the arrow F and data is either recorded on the magnetic tape 52 by the rotary head or the rotary head reproduces data recorded on the magnetic tape 52. When the capstan motor 58 reverses and the capstan 57 is rotated in a clockwise direction, the magnetic tape 52 is run in a reverse direction indicated in the drawing by arrow R. The recording of data on the magnetic tape 52 is accomplished by reproducing the recorded location to verify that the data has been recorded. As a result, the capstan repeatedly rotates in counter-clockwise and clockwise directions and the magnetic tape 52 repeatedly runs in forward and reverse directions.

The capstan motor 58 has a stator coil 61, a rotor magnet 60, a capstan 57 that is fixedly mounted on and vertically penetrates the rotor magnet 60, a capstan motor support plate 63 and a capstan housing 64. The stator coil 61 is attached to a lower surface of the capstan motor support plate 63. The capstan 57 is supported at both a top and a base portion by bearings 64a within the capstan housing 64. The capstan motor support plate 63 is caulked and fixedly mounted on a lower surface of a flange part 64b of the capstan housing 64. The rotor magnet 60 is disposed opposite the stator coil 61 across an air gap 65 interposed therebetween. The capstan motor support plate 63 is mounted on an upper surface of the chassis 62 in a manner to be described later. The rotor magnet 60 is accommodated within an opening 62a in the chassis 62. The sub-chassis 66 is mounted on the upper surface of the chassis 62 so as to cover the capstan motor support plate 63.

Figure 3A:
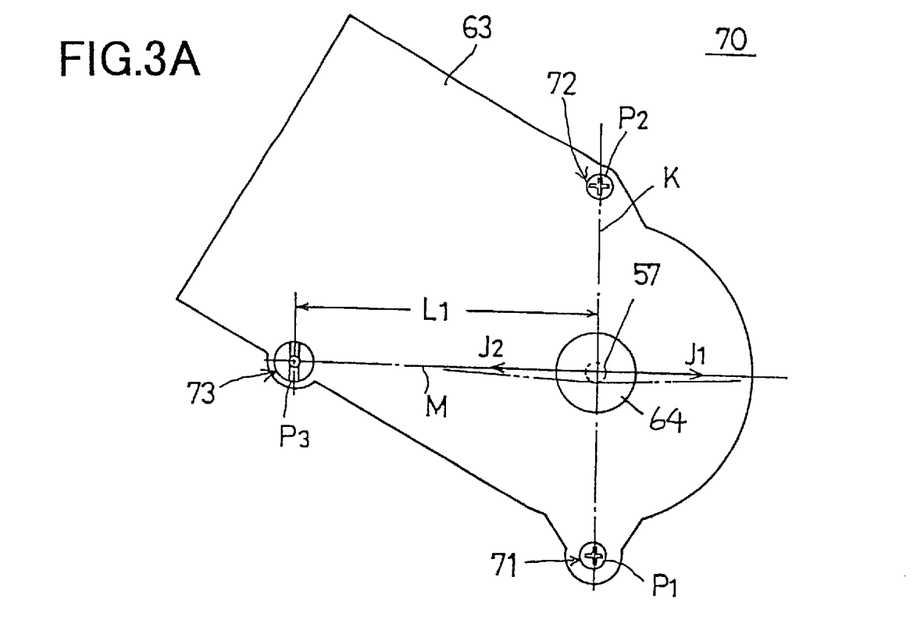
FIGS. 3A and 3B are plan and side cross-sectional views, respectively, of the capstan tilt adjustment mechanism of FIG. 2.

In FIG. 3A, the direction in which the tilt of the capstan 57 should be adjusted in order to make the magnetic tape behave when running in reverse the same way it behaves when running forward is indicated by arrows J1 and J2. Arrows J1 and J2 indicate a direction identical to the direction in which the magnetic tape 52 runs in the vicinity of the capstan 57.

Figure 3B:
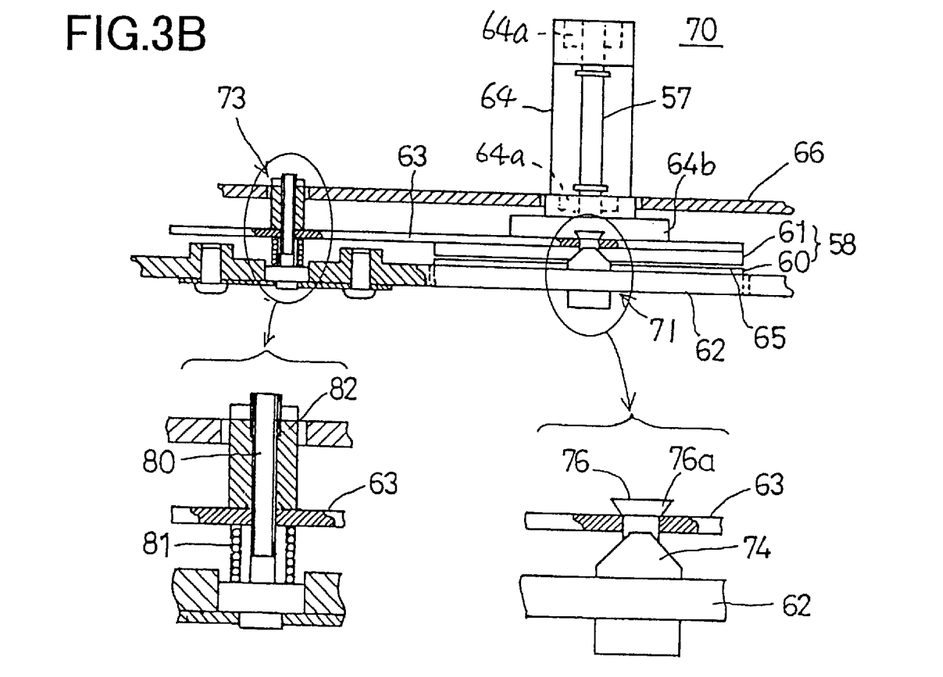
Figure 4:
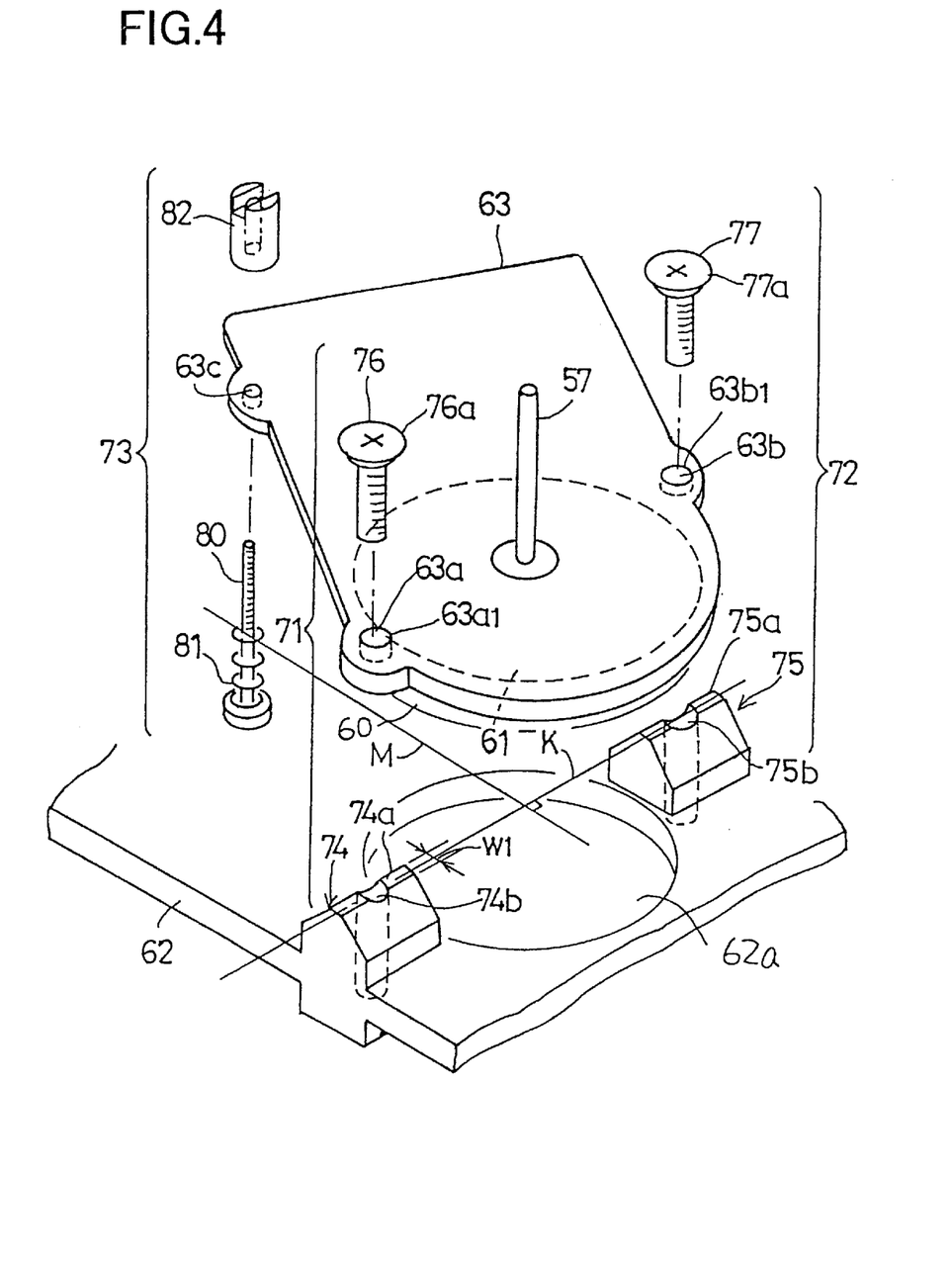
FIG. 4 is a an exploded view of another capstan tilt adjustment mechanism shown in FIG. 3 according to another embodiment of the present invention.

The DAT streamer 50 has a capstan tilt adjustment mechanism 70. As shown in FIGS. 3A and 3B and FIG. 4, the capstan tilt adjustment mechanism 70 has first and second supporting parts 71 and 72 that both support and at the same time fixedly mount the capstan motor support plate 63 at two locations, as well as an adjusting screw mechanism 73 at one location that moves vertically with respect to the surface of the capstan motor support plate 63.

As shown in FIGS. 2 and 3A, the first and second supporting parts 71 and 72 are aligned along a line K that passes through the center of the capstan 57 and runs perpendicular to the direction indicated by arrows J1, J2 and are positioned symmetrically at positions P1 and P2 on both sides of the capstan 57. It should be noted that the direction indicated by line K is the same as the direction indicated by arrow N, which is the direction in which the pinch roller 56 presses against the capstan 57. The adjusting screw mechanism 73 lies on a line M that passes through the center of the capstan 57 and intersects perpendicular to the above-described line K, and is positioned at a position P3 at a distance L1 from the capstan in the direction indicated by arrow J2. This distance L1 is approximately 30 mm, which is long. Holes 63a, 63b and 63c are formed on the capstan motor support plate 63 at locations corresponding to above-mentioned locations P1, P2 and P3.

First and second supporting parts 71 and 72 have the same structure and resemble a fulcrum. As shown in FIG. 3B and FIG. 4, reference numerals 74 and 75 are the base portions of the fulcrum and project upward from the chassis 62 with which they form a single integrated unit, having a longer wedge-shaped axis in the direction of the line K. The supporting surfaces 74a and 75a at the apexes of the base portions 74 and 75 have a width W1 of only approximately 1 mm in a direction perpendicular to the direction of line K. The first and second supporting parts 71 and 72 have a rigidity sufficient to prevent movement of the capstan motor support plate 63 in a vertical direction with respect to the surface of the capstan motor support plate 63. Additionally, vertical screw holes 74b and 75b are formed in each of the base portions 74 and 75 of the fulcrum. Reference numerals 76 and 77 are countersunk screws, with head portions 76a and 77a having a shape like that of an inverted cone.

The countersunk screws 76 and 77 are passed through the holes 63a and 63b formed in the capstan motor support plate 63 and are screwed into the screw holes 74b and 75b, the capstan motor support plate 63 resting on top of the supporting surfaces 74a and 75a of the apexes of the base portions 74 and 75 of the fulcrum and supported by and fixedly mounted thereto.

As mentioned previously, the supporting surfaces 74a and 75a at the apexes of the base portions 74 and 75 of the fulcrum have a narrow width W1 of approximately 1 mm in a direction perpendicular to line K. Moreover, the portions where the head portions 76a and 77a of the countersunk screws 76 and 77 press down upon the capstan motor support plate are restricted to only the edges 63a1 and 63b1 of the holes 63a and 63b, such that the upper surface of the capstan motor support plate 63 in the periphery of the holes 63a and 63b is not suppressed. Accordingly, the restrictive force exerted on the first and second supporting parts 71 and 72 by the capstan motor support plate 63 during its swinging displacement is small. As a result, the swinging displacement clockwise and counter-clockwise of the capstan motor support plate 63 through the range of the small angle centered on line K does not bend the capstan motor support plate 63.

The support surface 75a of the second supporting part 72 and the head portion 76a of the countersunk screw 76 receive the force of the pinch roller 56 pressing against the capstan 57.

As shown in FIGS. 3B and 4, the adjusting screw mechanism 73 comprises a bolt 80 that is vertically mounted on the chassis 62, a compression coil spring 81 fitted around the bolt 80, the lower surface of the capstan motor support plate 63 around the periphery of the hole 63a formed in the capstan motor support plate 63 resting on a top edge of the compression coil spring 81, and a screw 82 engaging that portion of the bolt 80 that projects upward from the hole 63c.

Tightening the screw 82 causes the position P3 of the capstan motor support plate 63 to sink and loosening the screw 82 causes the position P3 of the capstan motor support plate 63 to rise.

As mentioned previously, the capstan motor support plate 63 is supported and fixedly mounted atop the supporting surfaces 74a and 75a at the apexes of the first and second supporting parts 71 and 72, so that even with the exertion of the force of the pinch roller 56 pressing against the capstan 57 the capstan motor support plate 63 does not sink at positions P1 and P2 but is maintained at a predetermined level. Accordingly, the capstan motor support plate 63 does not tilt toward the P2 position side but swings and tilts about line K. The tip of the capstan 57 is not displaced in the direction of line K but is instead displaced along line M either toward or away from position P3. Accordingly, the tilt of the capstan 57 is always adjusted so that the tip of the capstan is displaced either in the direction indicated by arrow J1 or the direction indicated by arrow J2. Accordingly, the magnetic tape is definitely adjusted so as to behave the same way when run in reverse as it does when run forward.

As described above, the restrictive force exerted by the capstan motor support plate 63 on the first and second supporting parts 71 and 72 is small, so the swinging displacement clockwise and counter-clockwise of the capstan motor support plate 63 through the range of the small angle centered on line K does not bend the capstan motor support plate 63 and, accordingly, the width of the air gap 65 does not change. As a result, the characteristics of the capstan motor 58 are not affected.

Additionally, the above-described distance L1 is approximately 30 mm, which is long. As a result, the angle of deflection of the capstan 57 is small in relation to any given angle of rotation of the screw 82, so it is possible to make fine adjustments to the angle of the capstan 57.

Additionally, the first and second supporting parts 71 and 72 both have rigid structures, so vibration of the capstan motor support plate 63 is not amplified in the event that external vibrations are received and the capstan 57 and the area thereabout acquire a vibration resistance superior to that of the conventional art.

Next, a description will be given of another embodiment of the capstan tilt adjustment mechanism with reference to FIGS. 5A, 5B, 6 and 7. This capstan tilt adjustment mechanism 70A uses the same supporting member 71 as the capstan tilt adjustment mechanism 70 described above but the second supporting member 72A is not fixedly mounted by a screw. Moreover, an adjusting screw mechanism 90 and a spring-loaded pushing mechanism 91 have replaced the adjusting screw mechanism 73. Otherwise, the structural parts in FIGS. 5A, 5B, 6 and 7 that are the same as the structural parts in FIGS. 3A, 3B and 4 are given the same reference numerals, and the structural parts that are not the same but which correspond are given the same reference numerals but with the letter "A" added.

Figure 7:
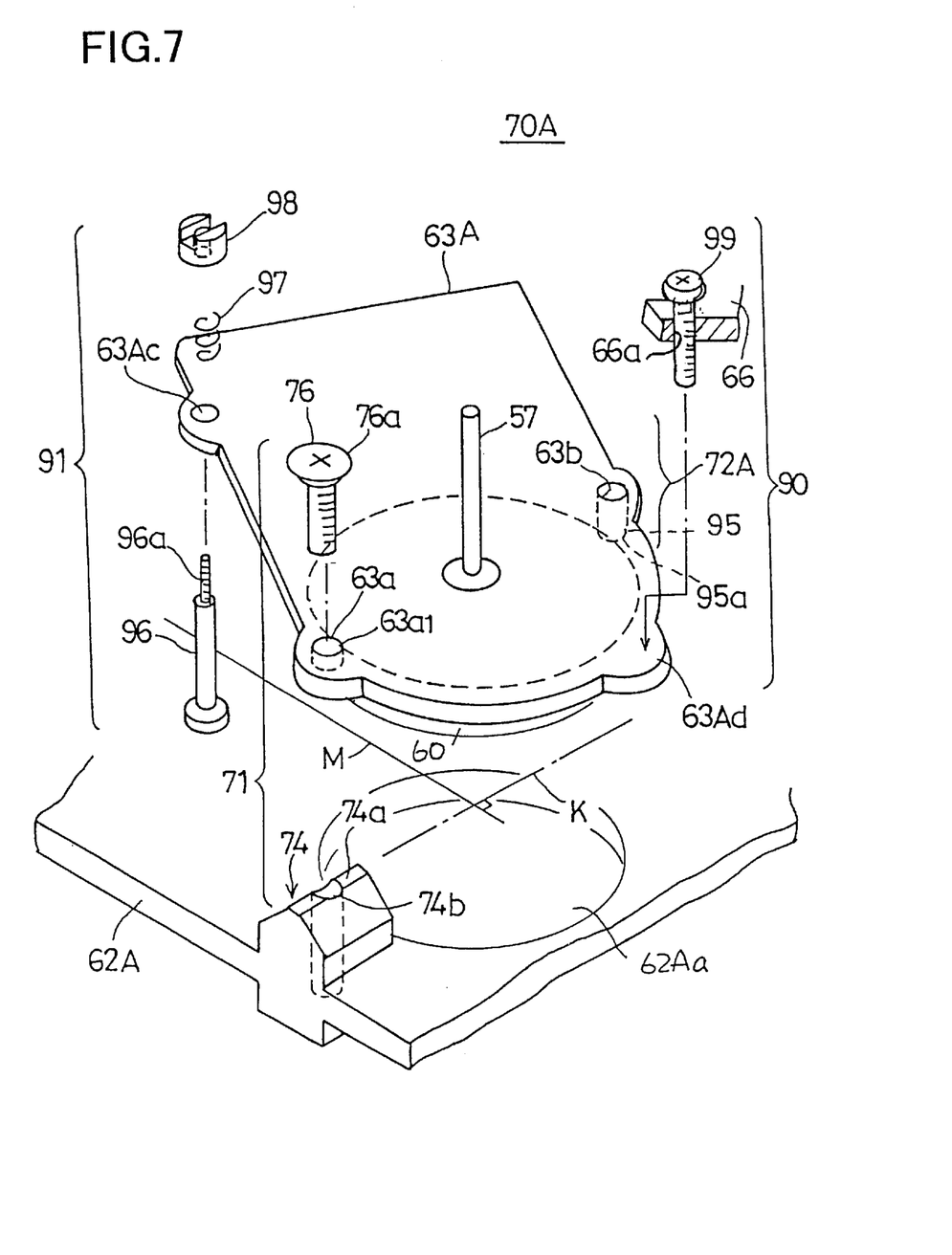
FIG. 7 is an exploded view of the capstan tilt adjustment mechanism shown in FIG. 5A.

In FIG. 7, the supporting base portion 74 shown in FIG. 4 is formed on a chassis 62A but the supporting base portion 75 shown in FIG. 4 is not. A second supporting part 72A comprises a supporting pin 95 fixedly mounted at a location of a hole 63b in a capstan motor support plate 63A. The supporting pin 95 protrudes downward and a rounded portion 95a at the bottom tip of the supporting pin 95 contacts an upper surface of the capstan motor support plate 63A. The pressing force of the pinch roller 56 is exerted downward on the supporting pin 95 and the supporting pin 95 is pressed by the upper surface of the chassis 62A.

Accordingly, the first supporting part 71 and of course the second supporting part 72A as well have a rigidity which prevents the capstan motor support plate 63 from moving in a direction downward from and perpendicular to the surface of the capstan motor support plate 63.

The spring-loaded pushing mechanism 91 is provided at the location of the adjusting screw mechanism 73 shown in FIG. 4. A guide pole 96 having a bolt 96a at a tip portion thereof is fixedly mounted perpendicular to the chassis 62, a hole 63Ac in the capstan motor support plate 63A engages the guide pole 96, a compression coil spring 97 engages that portion of the guide pole 96 which protrudes above the hole 63Ac and rests atop the capstan motor support plate 63A. A screw 98 engages the bolt 96a, the compression coil spring 97 is compressed between the screw 98 and the capstan motor support plate 63A and the capstan motor support plate 63A is pressed downward.

The adjusting screw mechanism 90 is atop line M and is provided at a portion opposite the spring-loaded pushing mechanism 91 with respect to the capstan 57. This adjusting screw mechanism 90 comprises a bolt-like adjusting screw 99 that engages a screw hole 66a in a sub-chassis 66 and which projects below a bottom of the sub-chassis, the bottom tip of the which presses on a portion 63Ad of the capstan motor support plate 63A.

Figure 5A:
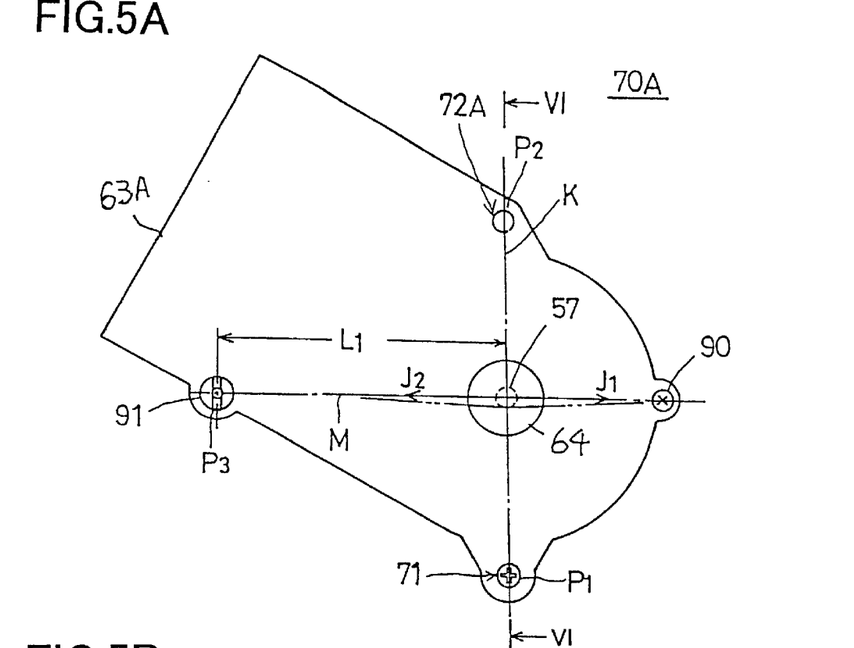
FIGS. 5A and 5B are diagrams showing a capstan tilt adjustment mechanism according to another embodiment of the present invention.
Figure 5B:
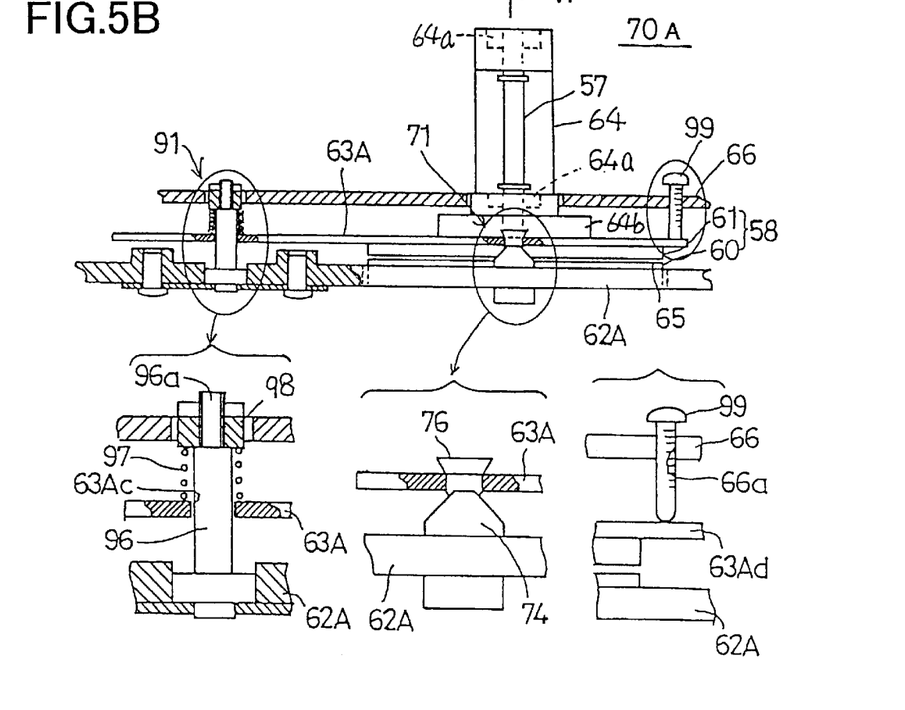
Figure 6:
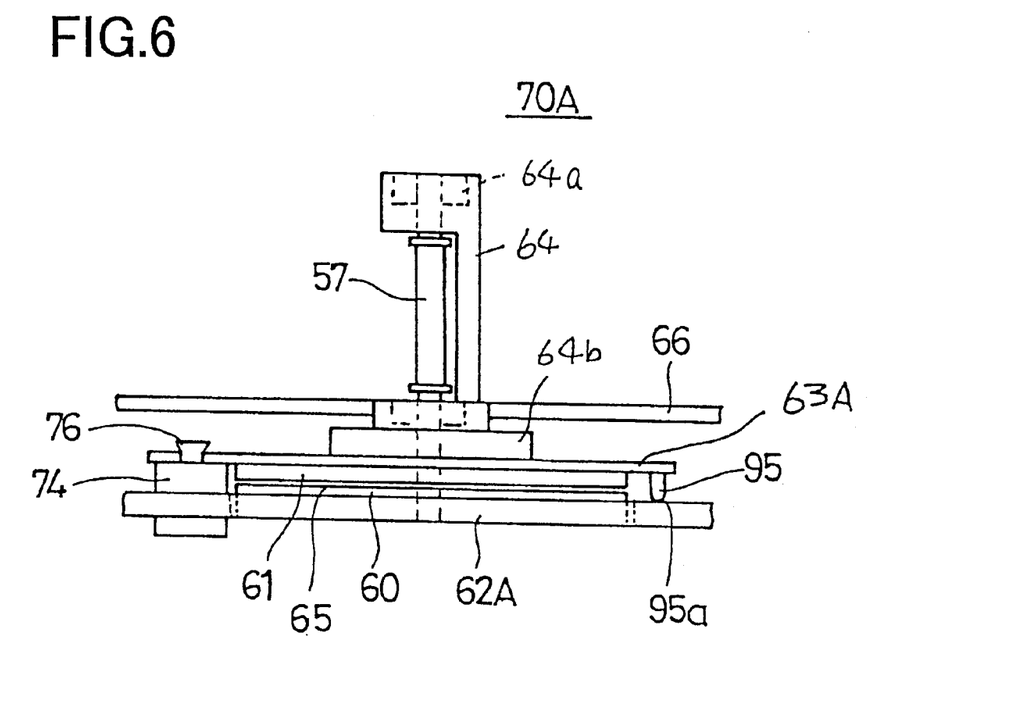
FIG. 6 is a cross-sectional view along a line VI—VI of the capstan tilt adjustment mechanism shown in FIG. 5A.

By rotating the adjusting screw 99 as appropriate, the capstan motor support plate 63A swings and tilts about line K, the tilt is adjusted so that the tip of the capstan 57 is deflected in either the direction of arrow J2 or the direction of arrow J1 and the magnetic tape behaves the same when run in reverse as it does when run forward.

The second supporting part 72A of this capstan tilt adjustment mechanism 70A is not fixedly mounted in place by a screw, so the restrictive force exerted on the capstan motor support plate 63A is weak as compared to that of the capstan tilt adjustment mechanism 70 described above. Accordingly, the capstan motor support plate 63A is tilted more smoothly than with the capstan tilt adjustment mechanism 70 described above, and the tilt adjustment of the capstan 57 is performed more smoothly.

Figure 8:
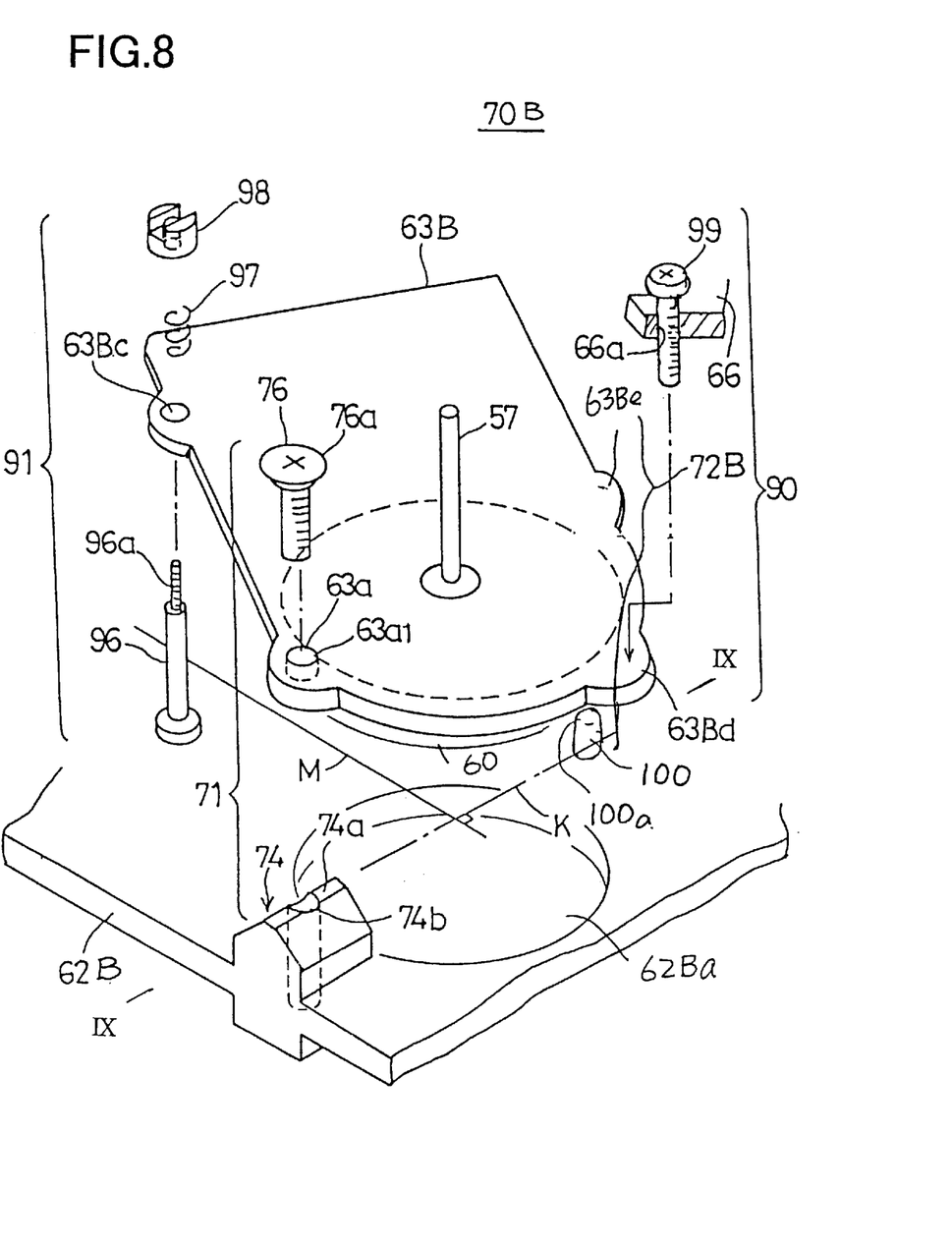
FIG. 8 is a diagram showing a capstan tilt adjustment mechanism according to another and further embodiment of the present invention.
Figure 9:
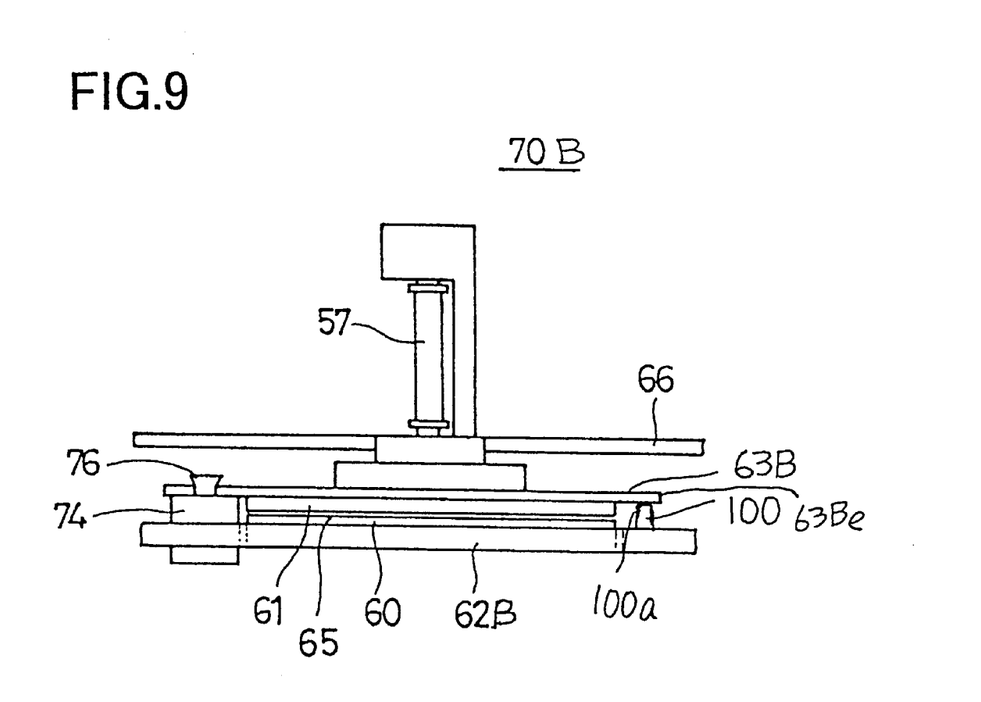
FIG. 9 is a vertical cross-sectional view including the line IX—IX shown in FIG. 8.

Next, a description will be given of another and further embodiment of the capstan tilt adjustment mechanism with reference to FIGS. 8 and 9. This capstan tilt adjustment mechanism 70B is the same as the capstan tilt adjustment mechanism 70A described above except for the second supporting part 72A, which is replaced with a second supporting part 72B.

The second supporting part 72B has a structure that is the reverse of the structure of the second supporting part 72A shown in FIG. 7. That is, a supporting pin 100 is fixedly mounted on and projects upwardly from a chassis 62B. A rounded part 100a of an upper tip of the supporting pin 100 contacts a lower surface of a projecting portion 63Be of a capstan motor support plate 63B. The supporting pin 100 receives the pressing force of the pinch roller 56.

As with the previously described embodiment, by rotating the adjusting screw 99 as appropriate the capstan motor support plate 63A swings and tilts about line K, the tilt is adjusted so that the tip of the capstan 57 is deflected in either the direction of arrow J2 or the direction of arrow J1 and the magnetic tape behaves the same when run in reverse as it does when run forward.

The second supporting part 72B of this capstan tilt adjustment mechanism 70B is not fixedly mounted in place by a screw, so the restrictive force exerted on the capstan motor support plate 63B is weak as compared to that of the capstan tilt adjustment mechanism 70 described above. Accordingly, the capstan motor support plate 63B is tilted smoothly with even less bending than with the capstan tilt adjustment mechanism 70 described above, and the tilt adjustment of the capstan 57 is performed more smoothly.

The above description is provided in order to enable any person skilled in the art to make and use the invention and sets forth the best mode contemplated by the inventors of carrying out the invention.

The present invention is not limited to the specifically disclosed embodiment, and variations and modifications may be made without departing from the scope of the present invention.

The present application is based on Japanese Priority Application No. 10-362954 filed on Dec. 21, 1998, the entire contents of which are hereby incorporated by reference.

What is claimed is:

1. A magnetic tape recording/reproducing apparatus comprising:
   a pinch roller;
   a capstan against which the pinch roller presses so as to drive a magnetic tape; and
   a capstan tilt adjustment mechanism for adjusting the tilt of the capstan so that the magnetic tape runs substantially smoothly and without damage to the edges of the tape,
   the capstan tilt adjustment mechanism further comprising:
   a support plate for rotatably supporting the capstan;
   a first supporting part and a second supporting part for pivotally supporting the support plate with respect to a chassis at positions on both sides of the capstan so as to tilt the capstan in a direction which ensures that the magnetic tape runs substantially smoothly and without damage to the edges of the tape; and
   an adjusting screw mechanism for pivoting the support plate with respect to the chassis,
   both the first and second supporting parts having a structure that rises from the chassis and has a straight-line ridge in contact with the support plate.

2. The magnetic tape recording/reproducing apparatus as claimed in claim 1, wherein the first and second supporting parts comprise members having a rigidity that prevents movement of the support plate in a vertical direction.

3. The magnetic tape recording/reproducing apparatus as claimed in claim 1, wherein the first and second supporting parts each comprise:
   a substantially wedge-shaped supporting base portion formed on the chassis; and
   a countersunk screw which passes through a hole in the support plate and screws into a hole in the supporting base portion and which mounts the support plate on the supporting base portion.

4. The magnetic tape recording/reproducing apparatus as claimed in claim 1, wherein the first supporting part comprises:
   a supporting base portion formed on the chassis; and
   a screw that passes through a hole in the support plate and screws into the supporting base portion and mounts the support plate on the supporting base portion,
   and wherein the second supporting part comprises a supporting pin mounted on the support plate and projecting below the support plate, and which contacts an upper surface of the chassis.

5. The magnetic tape recording/reproducing apparatus as claimed in claim 1, wherein the first supporting part comprises:

a supporting base portion formed on the chassis; and a screw that passes through a hole in the support plate and screws into the supporting base portion and mounts the support plate on the supporting base portion, and wherein the second supporting part comprises a supporting pin mounted on the chassis and projecting upward therefrom, and contacting a lower surface of the support plate.

6. A magnetic tape recording/reproducing apparatus comprising:

a pinch roller;

a capstan against which the pinch roller presses so as to drive a magnetic tape; and a capstan tilt adjustment mechanism for adjusting the tilt of the capstan so that the magnetic tape runs substantially smoothly and without damage to the edges of the tape, the capstan tilt adjustment mechanism further comprising:

a support plate for rotatably supporting the capstan;

a first supporting part and a second supporting part for pivotally supporting the support plate with respect to a chassis at positions on both sides of the capstan so as to tilt the capstan in a direction which ensures that the magnetic tape runs substantially smoothly and without damage to the edges of the tape; and an adjusting screw mechanism for pivoting the support plate with respect to the chassis, both the first and second supporting parts having a structure that pivotally fixes the support plate at a predetermined height position above the chassis, wherein the first and second supporting parts are disposed along a line that passes through the capstan and which further lies in a direction in which the pinch roller is pressed against the capstan.

* * * * *